Oct. 28, 1958     R. B. CLEVERLY     2,857,622
APPARATUS FOR MAKING SEALING MEANS FOR SEWER PIPE JOINTS
Filed Nov. 10, 1953     3 Sheets-Sheet 1

INVENTOR.
Robert B. Cleverly
BY
Hyde, Meyer, Baldwin & Doran
ATTORNEYS

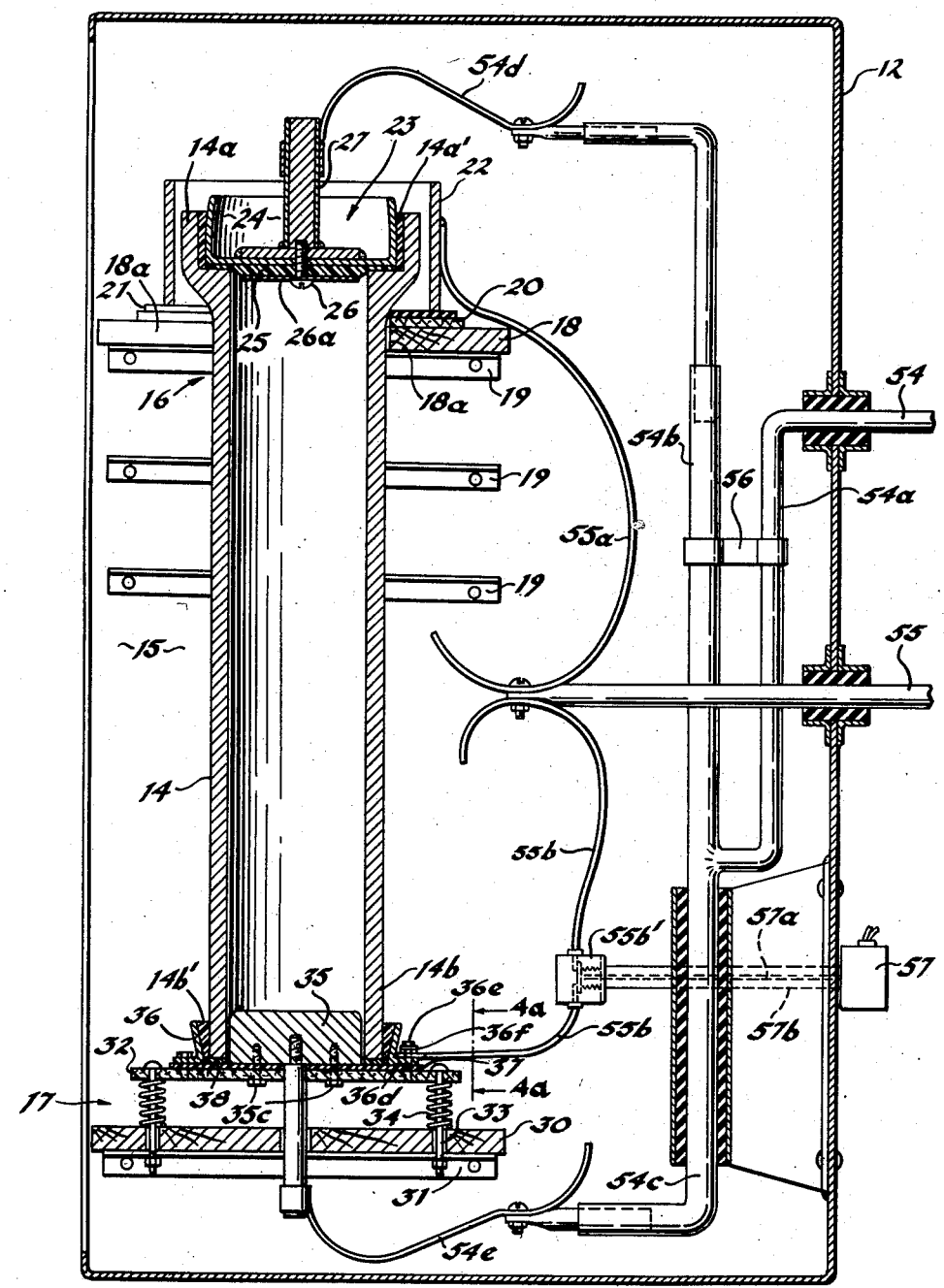

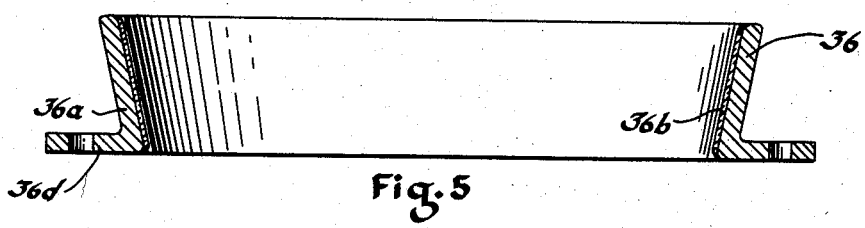
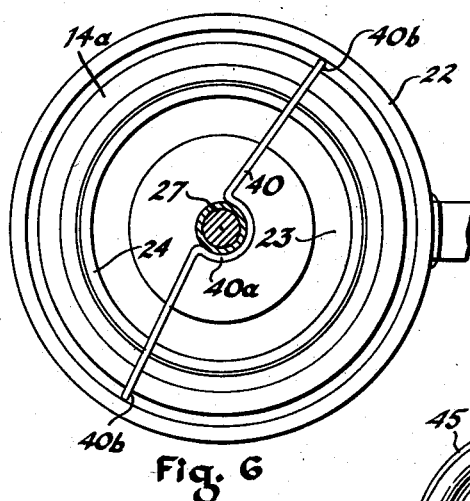
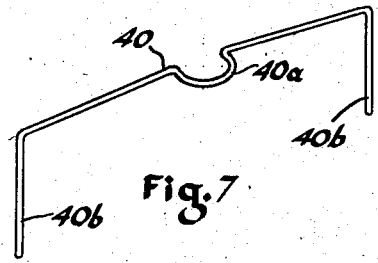
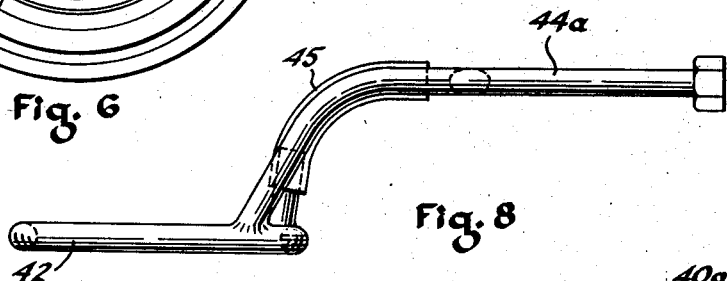
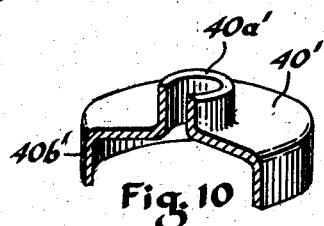
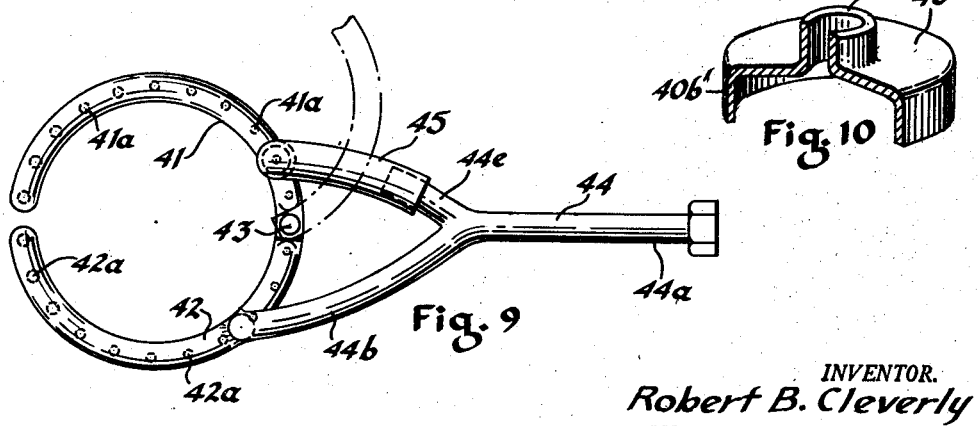
INVENTOR.
Robert B. Cleverly
BY
ATTORNEYS United States Patent Office 2,857,622
Patented Oct. 28, 1958

2,857,622

APPARATUS FOR MAKING SEALING MEANS FOR SEWER PIPE JOINTS

Robert B. Cleverly, East Liverpool, Ohio, assignor to American Vitrified Products Company, Cleveland, Ohio, a corporation of New Jersey Application November 10, 1953, Serial No. 391,161

8 Claims. (Cl. 18—26)

This invention relates to improvements in apparatus for forming plastic material and more particularly when said plastic material takes the form of sealing means for sewer pipe joints.

One of the objects of the present invention is to provide an apparatus for (1) forming a sealing means either at one end or at both ends simultaneously of a sewer pipe, (2) supporting a pipe with due consideration for irregularities in its manufacturing dimensions, (3) curing the plastic in the pipe sealing means by dielectric heating, (4) properly shielding the dielectric heating to prevent interference while still permitting easy and convenient loading and unloading of the pipe, (5) providing a simplified construction of dielectric heating electrodes and plastic forming dies, and/or (6) using one or more of the foregoing assembled in the form of an apparatus for production forming of the sealing means at a rapid rate.

A further object of the present invention is to provide an apparatus to perform any one or all of these features of the present invention with it being characterized by its structural simplicity, operating efficiency, inexpensive manufacturing cost, and economical operation.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 4 is a vertical, diametrical, enlarged sectional view through the cage, pipe support and pipe taken along the line 4—4 of Fig. 3;

Fig. 4a is a fragmentary side elevational view taken along line 4a—4a in Fig. 4;

Fig. 5 is an enlarged sectional view of the outer part around the spigot or lower end of the pipe in Fig. 4 with this part forming both the outer electrode and the die;

Fig. 6 is a horizontal sectional view looking downwardly upon the top of the pipe in Fig. 4 and showing a gage means for centering the electrodes and die of the inner and outer parts relative to the socket end of the pipe so that uniform dielectric heating will result and so that the sealing means formed thereby will have a uniform wall thickness;

Fig. 7 is a perspective view of the engaging means of Fig. 6 when detached;

Fig. 8 is a side elevational view of the nozzles for pouring the plastic material between the die portions and the pipe surface at the work station located at the lower end of Fig. 1;

Fig. 9 is a top plan view of the pouring apparatus of Fig. 8 with one section thereof shown in its closed position for pouring in the solid line position and in its open position for attachment or detachment from the pipe in its dot-dash line position; while Fig. 10 is a view partially in perspective and partially in section of a modified form of the gage means shown in Figs. 6 and 7.

Before the apparatus here illustrated are specifically described, it is to be understood that the invention here involved is not limited to the structural details, arrangement of parts, or method steps here shown and described since apparatus and methods embodying the present invention may take various forms. It also is to be understood that the praseology or terminology herein emplyed is for purposes of description and not of limitation since the scope of the present invention is denoted by the appended claims.

While this invention might be adapted to various apparatus, I have chosen to show the same as used for making joint sealing means for ceramic sewer pipes. The sealing means is formed simultaneously at opposite ends around the spigot and within the enlarged bell end of the sewer pipe. The method may be described briefly as including the steps of applying adhesive around the outside of the spigot end and within the bell on the opposite end, of telescopically associating a seal-forming die of proper contour with each end, of pouring heat curable synthetic resin plastic material simultaneously into the die cavity between each die and the pipe with this material being poured in uniformly around the full length of the die cavity, applying dielectric heat simultaneously to the plastic of both of said cavities for causing the fusion thereof, of trimming the excess plastic with a heated knife, and of cooling so as to remove the die from the finished sealing means.

The present invention relates to the formation of joint sealing means on opposite ends, both the bell and spigot ends, of a baked ceramic sewer pipe. The pipe is shown at 14 in Fig. 4 with the finished sealing means 14a' and 14b' on bell end 14a and spigot end 14b respectively. After the joint sealing means are formed and the pipes are removed from the machine, they can be put together easily, quickly and permanently by forcing the male sealing means 14b' on the spigot end of one pipe into the bore of the female sealing means 14a' on the socket end 14a of an adjacent pipe so that these sealing means deform and lock the pipes in assembled relationship.

Although each sealing means can be made from a wide variety of materials including synthetic resin plastic material, it has been chosen to show the same composed of plastisol having the following characteristics: durometer hardness (Shore type A-2) of 40+5, compression set (ASTM 394-49T, Method B) 30% maximum, and composed of polyvinyl chloride and a plastisizer.

At the heating station, the plastic is finished or cured so that the liquid plastic having a room temperature when poured into the die cavities becomes sufficiently hard for use at normal room temperature after the heat has been applied. The terms "finishing" and "curing" apply readily to either thermoplastic or thermosetting material, the latter being heat-hardenable. Both will be sufficiently hard for its intended use after being cooled from the elevated temperature.

Figure 1:
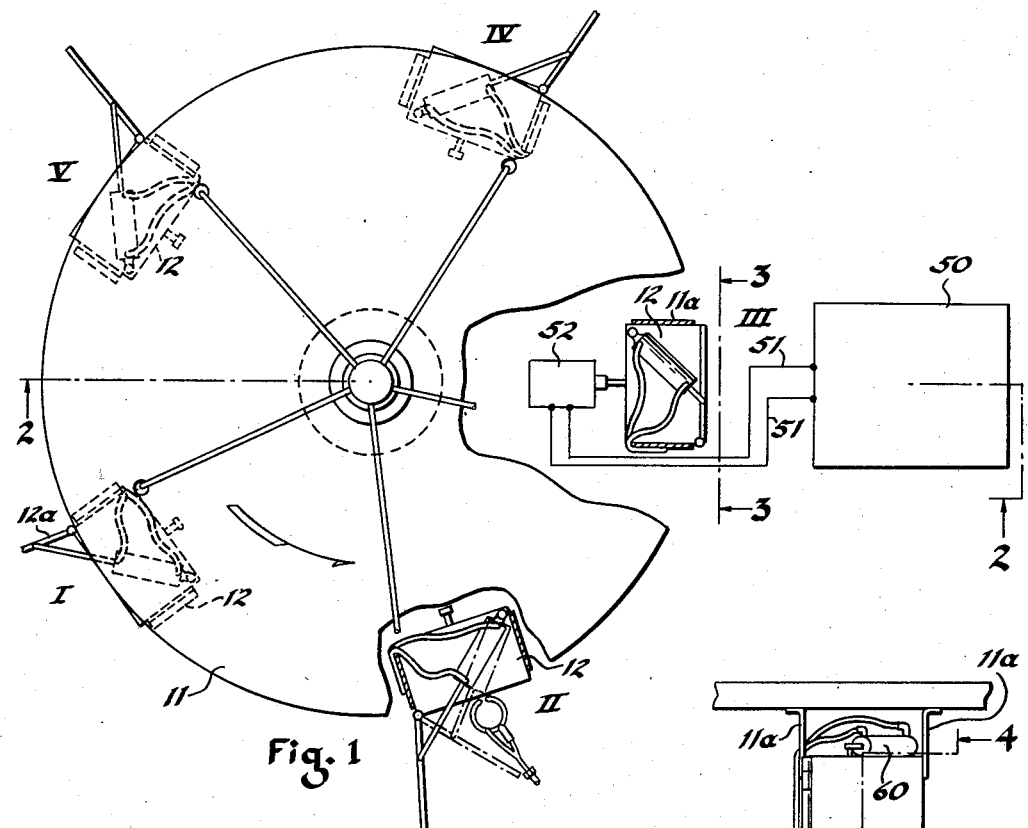
Fig. 1 is a top view of the apparatus form of this invention and includes the turntable for indexing the pipe between work stations.
Figure 2:
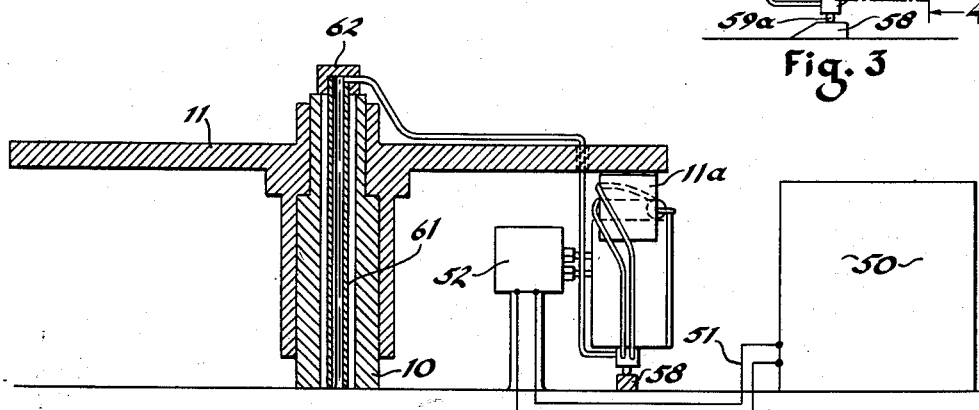
Fig. 2 is a vertical, diametrical sectional view taken along the line 2—2 through the turntable, the heating work station, and the radio frequency generator for supplying dielectric heating thereto.

This machine or apparatus is generally shown in Figs. 1 and 2 and includes a central column 10 on which is rotatably mounted a turntable 11 for rotation about a central vertical axis. This turntable 11 carries a plurality of grounded cages 12 thereon with each cage being identical in design and suspended from the bottom of the turntable 11 by brackets 11a. The turntable 11 is periodically indexed by a conventional Geneva motion drive or other suitable device. The apparatus has any convenient number of work stations but, for illustrative purposes only, five have been shown in Fig. 1 with one cage 12 at each station and with the work stations designated I to V. As the turntable 11 is indexed, each cage moves to a following station so that all the operations are performed upon the pipe supported thereby. The joint sealing means forming operations are started in the lower left-hand corner at the loading station I and then the counterclockwise index of the turntable moves the pipe through the sequence of operation to the unloading station V at the upper left-hand corner. Although it is intended in the present disclosure that a worker or operator be located at each work station to perform the operations thereat, it should be readily apparent that one worker may handle two or more work stations or that all workers may be eliminated with the operations performed by properly synchronized automatic machinery.

Since each cage 12 is identical in construction, only one will be described and that is shown in greater detail in Fig. 4. It should be understood that all of the parts hereinafter described are completely enclosed in the grounded cage 12 so as to prevent radio and television interference. The ceramic sewer pipe receiving the sealing means on the joints thereof is shown at 14 in Fig. 4 and includes an enlarged upper bell or socket end 14a and a lower spigot end 14b with the pipe having cylindrical surfaces inside and out which are circular in cross-section. The pipe is supported by a frame located within and supported by the cage with this frame including spaced apart parallel side members 15, only one of which being shown in Fig. 4. Upper and lower pipe support members 16 and 17 are connected to and supported by the frame members 15.

The upper pipe support member, generally shown at 16, includes a plate 18 detachably supported by an opposing pair of angle supports 19 respectively secured to the opposite facing portions of the frame members 15 and spaced laterally apart a greater distance than the largest transverse dimension of the pipe. Three pairs of these angle supports 19 are provided, with one from each pair being shown in Fig. 4, so that this upper pipe support member is adjustably connected to the frame to accommodate pipes of substantially different lengths, as may be required. The plate 18 has a generally U-shape opening in the horizontal plane with its open mouth facing toward the left so that the cylindrical periphery of the pipe 14 below the bell 14a may be inserted therein by passing the pipe from left to right into this U-shaped cutout 18a. This cut out 18a has a width only slightly larger than the outside diameter of the pipe below the bell 14a so that when the pipe 14 is firmly nested in the curve at the base of the U, the solid wall of the plate 18 surrounds the pipe on three sides below this bell end 14a to provide adequate support for orientation of the pipe when the bell end 14a is uppermost. The plate 18 is preferably tilted slightly upwardly on the left end in Fig. 4 so as to hold the pipe rigid, allow for length variations therein and prevent rolling or sliding forwardly of the pipe.

This plate 18 may be made of wood or any other suitable insulating material and may support all of the parts shown above it in Fig. 4. However, it is preferable that under some conditions a better insulator be used. Here, insulation plates 20 and 21 have been added which are respectively formed from polyester fiberglass and foam silicone. However, it should be readily apparent that this plate can take the form alternatively of a single member or of homogeneous construction or of a plurality of component plates. The upper pipe support member 16 carries thereon parts 22 and 23 for forming and heating the plastic in sealing means 14a'. On the flat, horizontal upper surface of one of these plates is supported an outer part 22 surrounding the bell end 14a with its outer part being annular in form. An inner part 23, in registry with outer part 22 and also annular in form, comprises an annular shell 24 having secured to its lower face an annular gasket formed of foam silicone and being held in position by attaching screw 26 bearing against a retaining central washer 26a. A central stem 27 is welded in place to the bottom wall of shell 24, and this central stem 27 is suitably weighted by having its hollow center filled by Babbitt metal so that the weight of the whole inner member presses the gasket 25 down firmly against the flat, horizontal inner shoulder on the bell end 14a of the pipe so that the gasket will prevent any leakage of the plastic material while the sealing means 14a' of the bell end is being formed. The gasket 25 has a tapered shoulder connecting its thick mid portion and thin annular outer portion with this shoulder providing sealing contact even though there may be uneven surface and dimensional variations on different pipes.

The lower support 17 includes a base plate 30 detachably supported by the frame members 15 by means of inwardly facing angle supports 31, two in number with one on each frame member 15 so that they correspond to any one pair of angle support members 19. This base plate 30 has a platform resiliently supported thereon with this platform including a plate 32 having a flat upper surface and being formed of some suitable insulating material such as polyester fiberglass. Resilient support of this platform is provided by having at each of the four corners thereof a bolt and screw unit 33 loosely fitting in a hole of the base plate 30 and having a compression spring 34 telescoped thereover.

The lower pipe support member 17 carries parts 35 and 36 for forming and heating the plastic in sealing means 14b. An inner part 35, annular in form, is telescopically associated with the bore of the pipe at the spigot end 14b to serve as a locating means therefor and is secured to the plate 32 by screws 35c. An outer part 36, also annular in form, surrounds the spigot end 14b in registry with part 35. The support plate 32 may include a foam silicone plate 37 resting thereon, and of course, as mentioned with regard to the upper pipe support, these plates can be formed of any suitable material, either homogeneous or built up in layers. This drawing illustrates only one suitable embodiment. The outer part 36 is held down by having its outwardly extending annular flange 36d secured to plates 32 and 37 by circumferentially spaced screws 36e with two of these screws pressing a spring member 36f downwardly against flange 36d in Fig. 4a. Both the inner and outer parts 35 and 36 are supported on the upper, horizontal, flat surface of the plate 37 with an annular gasket 38, made of foam silicone or any other suitable material, extending therebetween for sealing under the weight of the pipe against the spigot end 14b to prevent plastic leakage, and for centering the inner and outer parts 35 and 36 relative to each other. Adequate sealing will take place under all conditions since the platform engageable with the spigot end 14b of the pipe is resiliently loaded by the springs 34 to assure sealing engagement regardless of variation in the pipe length or angle of pipe cut-off.

The plastic material used in forming the sealing means on the pipe joints must be suitably formed and then heated for finishing or curing to form the finished sealing means sufficiently rigid for normal use. The inner and outer members 22, 23, 35 and 36 provide these functions. Each of these members has either the shell thereof or the entire portion thereof formed of metal to serve as an electrode for dielectric heating of the plastic in forming the sealing means with these electrodes insulated or spaced from each other in any suitable fashion. In addition, the inner part 23 telescoped into the bell 14a, and the outer part 36, telescoped over the spigot end 14b have die portions on the outer and inner surfaces respectively thereof facing the pipe between which the plastic material may be poured.

The foam silicone gaskets 25 and 38 provide satisfactory insulators across the pairs of parts 22, 23, and 35, 36 with each pair acting as a capacitance. Also, gaskets 25 and 38 prevent leakage of the plastic by gravity down past the die and pipe. It is also important in dielectric heating that the electrodes formed by the parts 22, 23, 35 and 36 extend axially beyond the plastic of the sealing means whenever possible to provide thorough dielectric heating of the end portions thereof. It should be noted that the outer part 22 extends well above and below the upper sealing means 14a' and the inner part 23 extends well above. It should be noted that the gasket 38 at the lower end permits both parts 35 and 36 to extend well below the end of the pipe 14 and sealing means 14b' thereon.

The foam silicone prevents arcing and does not break down readily when located between or closely adjacent to the electrodes. It also has sufficient give to provide a satisfactory gasket to seal off against flow of the fluid plastics therepast.

Good insulation is very important between the spaced electrodes because poor insulation will break down and cause destructive arcing. Also, the pipe wall between each pair of electrodes must be adequately dry to prevent arcing. The pipes are generally dry enough when this process follows soon after baking or firing.

Since the outer part 22 and the inner part 35 serve only as electrodes, they may each be made of solid metal. However, inner part 23 and outer part 36 serve both as an electrode and a die for shaping the plastic material on the sealing means 14a' or 14b'. These latter parts with a dual function may be constructed in any of several ways. A conductor function can be provided by a thin-walled electrical conductor such as a metallic shell. The thin wall is desirable so that the heat-up time of the electrode will not be too great and thereby increase the time required for proper heat-up of the plastic material. If the mass of metal is too large, the heat-up time will be also correspondingly large. It should be noted that the mass of the weighted stem 27 is not in the heating zone so that it does not affect heat-up time.

The die portion surface can take the form of a wide variety of structures including (1) a separate covering, such as Pyrex, a non-conductive material, ceramic, etc. separate from the electrode shell, (2) a coating such as a ceramic, silicone, porcelain enamel, etc., or (3) the bare metal electrode forming the die surface portion without any covering thereon under some conditions. Any covering or coating used must be able to stand up under the high temperatures involved and still serve as a satisfactory electrical insulator.

Two structures performing satisfactorily under the conditions mentioned in more detail hereinafter, consists of an aluminum shell having a thin wall either with or without a porcelain enamel coating of about 5 mils thickness thereon on the die portion surface thereof. This is shown in more detail in Fig. 5 wherein the lower outer part 36 in Fig. 4 is shown with an aluminum shell 36a having a porcelain enamel coating 36b thereon. The metal shell wall thickness is preferably about ⅛ inch, or the minimum to maintain rigidity, but not over ¼ inch. Of course, if the die portion surface is either an integrally secured coating or the bare metal, the electrode and die portion are integrally formed and can be handled together as a unit.

The thickness of the covering or coating is also important. If it is too thick, too much heat will be required to heat it up.

Of course, the most inexpensive and the easiest to use is the part with the bare metal shell. The Pyrex is expensive and is difficult to make with a wall of sufficient thinness. A separate electrode means a separate item. Silicone may be too crumbly to stand up under handling in production. Therefore, the bare metal shell is the preferred construction.

Now since the major portion of the apparatus has been described, the balance will be described along with the different method steps in the order in which the steps occur.

Before each pipe is put into its cage, an adhesive is applied thereto and permitted to dry. The application is either manual or by machine in the form of a band to the spigot end periphery and to the bell end bore respectively directly below the future location of the sealing means 14b' and 14a'. This adhesive provides suitable adherence between the ceramic material of the pipe and the plastic making up each of the sealing means with this adhesive especially designed to adhere the parts together during the curing cycle. The adhesive Marbond RS246 has been found satisfactory to adhere the sealing means, when made of plastisol, to the baked ceramic sewer pipe.

Loading of the pipe into cage 12 and the centering of the electrode and die parts occurs at work station I in Fig. 1. Each cage 12 has a hinged door 12a normally open at all of the work stations except the heating or curing station III, and therefore the pipe 14 may be easily inserted into the cage 12 through the open doorway, pushed radially inwardly into the U-shaped cutout 18a, lowered so that the spigot end 14b fits between the inner and outer parts 35 and 36 with the inner part 35 serving as a centering means, and then permitting the springs 34 to come to an equilibrium position so that the pipe is supported partially by its bell end 14a in the U-shape cutout 18a and partially by the spring loaded platform engaging the spigot end. Then, the inner part 23 and the outer part 22 are respectively telescoped into and over the pipe bell end 14a. Now all of the parts 22, 23, 35 and 36 assume generally the relationship shown in Fig. 4 with each being telescopically associated at one end of the pipe.

The outer and inner parts 22 and 23 at the bell end 14a may be properly centered at either station I or station II prior to the pouring of the plastic material composing the sealing means. A gage means 40 in Figs. 6 and 7 is used for this purpose. This gage means 40 is formed from a single length of wire of proper diameter with an arcuate portion 40a formed at its center which is detachably engageable with the stem 27 of the inner member 23 and with a downwardly extending projecting portion taking the form of legs 40b, 40b at opposite ends detachably extendable between the outer surface of the pipe bell 14a and the bore of the outer part 22 with each leg approximately filling the space therebetween. Hence, centering is easily accomplished by engaging the gage means on the center stem 27 so that the gasket 25 of the inner member 23 and flat lower edge of outer member 22 will slide back and forth on the horizontal, flat and parallel surfaces on which they are supported until centering is accomplished. The choice of whether this operation will be performed at station I or station II may be determined on a time duration basis of the work performed at each station so that each will be as close to equal as possible. This gage means is readily detachable so that it is not in place during pouring and heating.

The material forming each of the sealing means is poured at station II. The plastic is applied to the pipe to form the joint sealing means 14a' and 14b' by pouring the plastic material into each of the die cavities simultaneously. This pouring takes place around the full 360 degree length of each annular shaped die cavity so that the viscous plastic will not entrap air during its flow and thereby cause air holes or porousness in the finished sealing means. A vertically spaced pair of nozzles, each similar to the one shown in Figs. 1 (work station II), 8 and 9, are provided on a common arm movable so that the nozzles can be simultaneously moved into position in the cage for pouring and then removed therefrom during indexing of the apparatus. Each nozzle, when properly located, is directly above one of the die cavities between the die and the pipe surface, so that the plastisol can be fed by gravity down into this cavity.

Each nozzle in Figs. 8 and 9 has two or more ring segment-shape sections 41, 42, hingedly secured together at 43, so that at least one thereof can move in a horizontal plane. These sections have a plurality of spaced discharge apertures 41a and 42a in their bottom surfaces along their respective lengths with the apertures in each section gradually increasing in diameter as they are located farther from pivot 43 so that the larger size of the more remote apertures will compensate for the drop in flow pressure and plastic will flow out of all apertures at a uniform rate. These sections 41, 42 are supported by a Y-shaped conduit means 44 having its stem 44a connectible on the right with a supply source of the fluid plastic material. Both of its forked arms 44b and 44c, 45 are connected in fluid communication with the sections 41 and 42. However, arm 44b is rigidly connected to section 42 while the other arm has a flexible tubing 45 so that this flexible portion will not only permit the plastic material to flow to the section 41 from the source but also permit the section 41 to be swung between the solid line and the dot-dash line positions in Fig. 9 while biasing it toward the solid line position. As the nozzles are moved toward the pipe, the swingable arm 41 of each is swung to the dot-dash line position so that the nozzle sections can travel past the pipe 14 above the lower sealing means or past the central stem 27 above the upper sealing means and then the resiliency of the flexible conduit 45 will close the nozzle sections 41 and 42 to the solid line positions so as to be properly aligned for pouring the plastic material by gravity around the full 360 degrees of each of the mold cavities.

It should be noted that the top of the inner member 23 is flared inwardly and the outer member 36 is flared outwardly to help pour or funnel the plastic material into the die cavity against the previously applied adhesive.

The plastic material of the sealing means 14a' and 14b' is cured or finished at the dielectric heating work station III. Here, heat is applied simultaneously on the plastic in both die cavities with the heating effect being supplied from a common radio frequency source. A radio frequency generator 50 in Fig. 2 is provided and is of any conventional design. This has leads 51, 51 therefrom extending under the path of the cages 12 carried by the apparatus to a stationary sliding contact box 52 adapted to make contact between said leads 51, 51 in a hot side conductor 54 and ground conductor 55 respectively of the cage 12 in Fig. 4 when at the work station III. The conductor 54 in Fig. 4 includes a downwardly extending portion 54a thereof dividing into two branches 54b and 54c going respectively to the bell end 14a and spigot end 14b of the pipe with the former connected to inner member 23 by a strap 54d telescoped over the central stem 27 at work stations I or II and the latter connected to the inner part 35 by a bolt extending loosely up through an enlarged hole in the base 30. The outer parts 22 and 36 are electrically connected with the ground conductor 55 by straps 55a and 55b respectively.

Means is provided for varying the heating effect so that the maximum voltage occurs across any desired pair of inner and outer electrode parts. In dielectric heating from a radio frequency generator, it is desirable to adjust the length of the leads so that the lead on the hot side from the radio frequency source to the location where heat is desired is about one-quarter wave length and then the maximum voltage will occur thereon with minimum loss. It has been found that this particular plastisol has its greatest excitement at a frequency of about 13.5 megacycles. This is about a 73 foot wave so that a one-quarter wave length would be about 18 feet. Adjustment is obtained by having the strap 54d, 54e, 55a and 55b slit on their ends nearest the conductors with a screw in each slit to form clamp connections therebetween so that the distance from the screw clamp to the inner or outer part serviced thereby can be varied within a limited range.

There is also a means for varying the heat supplied to the plastic on at least one end so that the plastic on both ends will be cured or finished over approximately the same time. This includes in addition to the aforementioned adjustment, an adjustable shunt having a crossbar 56 in Fig. 4 slidably and electrically connected between the conductors 54a and 54b so as to effect the voltage supplied to the opposite ends with the adjustment permitting the machine operator to adjust this vertically sliding bar until the heat supplied takes into account the different diameters and plate areas of the electrodes and the different volume of plastic on opposite ends of the plastic. Then, each will be supplied with the amount of heat required to cure it in exactly the same time as the curing at the opposite end.

A telescoping tube connection can be used if desired in place of the adjustable sliding shunt 56 and the slit straps coupled with the nut and bolt locking means thereon.

Since the shielding of the electrodes in the dielectric heating must be complete at work station III, the door 12a must be closed either manually or automatically. To prevent radio and television interference, the cage must be grounded either through the turntable 11 of the machine or the ground lead of the radio frequency generator. Preferably bronze wire screen or some other suitable material entirely surrounds the component parts with brass weather stripping around the frame of and contacting door 12a to prevent leakage between door 12a and frame 12. Also to prevent auroras and arcing, everything inside should have rounded corners and be made of non-metallic or non-conductive material.

Figure 3:
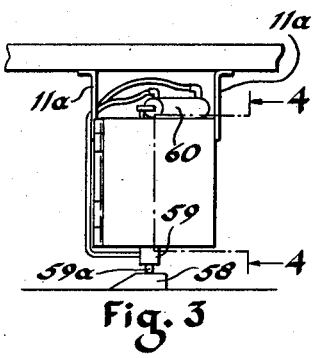
Fig. 3 is a side elevational view of the outside of a pipe containing cage looking inwardly in the radial direction toward the center of the turntable.

In the present disclosure, the door 12a of each cage is automatically closed as it approaches and while it remains in the work station III. This is done by a means responsive to the movement of the cage to this work station for closing the door and then responsive to the movement from the work station for opening the door so that loading, unloading and other operations can be performed with an open cage. A stationary cam 58 in Fig. 3 is located below the cage at the work station III for depressing an actuator 59a of a fluid pressure control valve 59. This valve controls a double acting fluid pressure cylinder 60 directing the flow from a source to either one side or the other of the cylinder 60 for either opening or closing the gate 12a while the other side of the cylinder is vented by valve 59 to exhaust. The fluid pressure is received from a central pipe 61 in the machine column 10 through which fluid pressure is distributed to the valve for the five cages by a rotatable cap 62 mounted on top of the stationary column 61 and rotatable with the turntable 11 so that the valves 59, cap 62 and connecting line all rotate with the table 11. Each cylinder 60 is pivotally mounted on one end to the top of its cage with the outer end of the piston rod being pivotally mounted to its swinging door 12a. Hence, the valve actuator 59a, when depressed by the cam 58 in approaching position III supplies pressure fluid to the piston rod side of the cylinder 60 and the door is closed. When the cage indexes past the cam 58, a spring in valve 59 moves the valve actuator to its extended or normal position so as to admit fluid pressure to the opposite end of the cylinder and to swing the door 12a to its open position.

When plastisol is used, the heating at work station

III serves to fuse together the plasticizer and the polyvinyl chloride, previously only mixed together and poured into the die cavities. The radio waves cause the molecules to move about rapidly so that their internal friction heats the plastisol and then when the plastisol is heated above its 350° F. fusion or fluxing temperature, the molecules combine so that upon cooling the joint sealing means can readily be used for their desired purpose. Of course, other types of heating can be used in place of dielectric heating, such as infra red, resistance or convection heating, but all of these have disadvantages and the period of heat-up is considerably longer than with the present disclosed method.

With plastisol having the characteristics mentioned heretofore, the following characteristics have been found to give preferred operating condition; 13.5 megacycles frequency, 18,000 volts peak, about 0.2 ampere starting current per pipe joint (about .4 amp in total), and 60 seconds' curing time. The 13.5 megacycle frequency gives the greatest excitation to the plastisol composition and therefore completes the operation in the shortest time. However, a good practical range is from 10 to 16 megacycles.

Of course, the actual curing time depends upon the voltage across any pair of electrodes and the capacitance of these electrodes with the latter dependent upon the distance between them, the surface areas thereof, and the type of insulating material located between them. Of course, the moisture in the baked ceramic pipe has an important effect upon the capacitance. The pipe must be dry because any water therein will be heated, will vaporize and turn to pressure steam; also, arcing between the electrodes may occur.

At work station IV, the operator trims the excess plastic from each joint sealing means, cools the assembly, and removes some of the electrodes. The spigot end sealing means 14b' is trimmed flush with the top of the outer part 36. After the sleeve at the left end of the strap 54d is telescoped off of the central stem 27 in Fig. 4 so that the annular outer part 22 can be swung off of the top or bell end 14a of the pipe, the sealing means 14a' on the bell end is trimmed flush with the top of the bell end 14a to assume the appearance shown in Fig. 4. The machine operator at station IV cuts off the excess plastic with a knife having a blade heated to about 530° F. with this knife sliding along the top of outer part 36 and bell end 14a to trim the plastic flush therewith. After trimming, a cooling air blast is directed against the inner surface of the inner electrode part 23 to cool it sufficiently to reduce its outside dimension for easy removal at either work station IV or V from within the sealing means 14a' even though the bore of the sealing means has a concave surface. No lubrication is needed for removal since the surfaces are smooth.

At work station V, the operator removes the mold inner part 23 and then removes the pipe 14 from the cage 12 along with the finished sealing means 14a' and 14b' firmly secured to and molded on the pipe.

The time between indexes of the turntable 11 will, of course, be based upon the longest working time at any one work station. This will probably be the 60 second curing time at the heating work station III. This long time between indexes may permit one operator to handle several work stations or may permit the combining of operations, such as at work stations V and I, to reduce the number of work stations and cages on the turntable 11. Normally, the machine will probably be designed to have an operator at each of the work stations except work station III. A modified form of gage means 40' in Fig. 10 may be used instead of gage means 40 in Figs. 6 and 7. This gage means 40' is formed from a wood block or other satisfactory material having an axial bore 40a' at its center with its arcuate portions detachably engageable with stem 27 and with a downwardly extending projecting portion taking the form of an annular flange 40b' detachably extendable between the entire length of the outer surface of the pipe bell 14a and the bore of the outer part 22. Centering is easier with gage means 40' because it need merly be pushed axially to perform the centering operation; it does not have to be rotated in the same manner as gage means 40.

When the sealing means 14b' at the spigot end is to be made of a different axial length when trimmed flush with the top of part 36, this can be easily done by removing gasket 38 and inserting another of a different thickness.

The high voltage used sometimes causes arcing across either the ceramic pipe or the plastisol or both. When this occurs, it is desirable to break the electrical contact on the end having the arcing before the joint sealing means thereon is ruined thereby. The radio frequency generator turns off to interrupt the current flow and the lead to the arcing end must be removed to put the cycle back in operation. Any of several methods can be used here. First, an electrical solenoid 57 is mounted on the back of each cage 12 with a hollow tube 57a fixed to the solenoid frame with an actuator rod 57b therein movable endwise by energization of said solenoid by an operator controlled button outside the cage. When the solenoid 57 is energized, the movement of actuator rod 57b toward the right breaks the electrical connection at circuit breaker 55b' between upper and lower halves of conductor 55b to break off the ground line from the spigot end 14b. Circuit breaker 55b' may be of any conventional form. Another independently operable solenoid and lead disengagement structure may be added to the bell end 14a on lead 55a if desired, but it has been found that arcing is more likely to occur at spigot end 14b because both parts 35 and 36 rest on a common plate 37. Second, both straps 54d and 54e have a sliding telescoping fit on their left end with the center electrode to permit quick disengagement by reaching into the cage. Also, the left end of strap 55b is detachably held in electrical contact with outer part 36 by being resiliently held between said part 36 and resilient spring member 36f in Fig. 4a. Then, the uncured or partially cured sealing means can be put into a furnace or other convenient heating mechanism wherein arcing will not occur so as to complete the curing.

When the higher production is desired, each cage may contain more than one pipe. Then, plate 18 has a plurality of U-shape cut-outs 18a, each opening toward the door side of the cage, and base 30 has a plurality of resiliently mounted platforms thereon. Of course, the number of pouring nozzles, etc. are increased proportionately.

Various changes in details and arrangement of parts can be made by one skilled in the art without departing from either the spirit of this invention or the scope of the appended claims.

What I claim is:

1. In an apparatus for supporting a pipe having spigot and bell ends thereon and forming a sealing means at the spigot ends thereof, a plate with a flat surface, an inner part on said plate surface telescopically associatable with the bore of said pipe to serve as a locating means therefor, an outer part on said plate surface for surrounding the spigot end, said outer part comprising a die portion on the surface thereof facing said pipe between which heat curable plastic may be poured, both of said parts including electrodes insulated with respect to each other for dielectric heating of said plastic, and a gasket on said plate surface extending between said parts for sealing against the spigot end to prevent plastic leakage, for centering said parts relative to each other, for permitting the electrodes to extend beyond the end of said pipe for proper dielectric heating of all of said plastic, and for controlling the axial length of the sealing means thereat.

2. In an apparatus for supporting a pipe having spigot and bell ends thereon and forming a sealing means at the spigot end thereof, a frame, an upper and lower pipe support member on said frame, said upper support member adapted to support said pipe by said bell end, said lower support member having a base and a resiliently supported platform movable relative thereto, said platform engageable with said spigot with the resiliency thereof assuring engagement regardless of variations in pipe length or angle of cutoff; said platform including a plate with a flat surface, including an inner part on said plate surface telescopically associatable with the bore of said pipe to serve as a locating means therefor, including an outer part on said plate surface for surrounding the spigot end, said outer part comprising a die portion on the surface thereof facing said pipe between which heat curable plastic may be poured, both of said parts including electrodes insulated with respect to each other for dielectric heating of said plastic, and including a gasket on said plate surface extending between said parts for sealing against the spigot end to prevent plastic leakage, for centering said parts relative to each other, and for permitting the electrodes to extend beyond the end of said pipe for proper dielectric heating of all of said plastic.

3. In an apparatus for forming a sealing means on at least the cylindrical bell end of a pipe, a member for supporting said pipe in a generally vertical position with bell end up, an inner part having a gasket pressable by the part's weight against the flat shoulder within said bell end, and an outer part supported by said member for surrounding said bell end, both of said parts including electrodes for dielectric heating of the material forming said sealing means, said inner part forming a die portion on the outer surface thereof for facing said pipe, and between which pipe and the outer surface said material is poured while said gasket prevents leakage.

4. In an apparatus for supporting a pipe having spigot and bell ends, respectively, a frame, upper and lower pipe supporting members on said frame for supporting the pipe in upright position with the bell end uppermost, the upper support member being adapted to support said pipe by engaging the underside of said bell end, said lower supporting member being in the form of a platform member movable relative to the frame, resilient means normally resiliently supporting the platform member in a raised position above the normal level at which the lower end of the pipe can be disposed when the underside of the bell end is engaged by the upper support member, said resilient means being compressible by the weight of the pipe, the resiliency of the compressible means assuring engagement of the platform member and lower end of the pipe, regardless of variations in the length of the pipe, when the underside of the bell end is supported by the upper support member.

5. An apparatus according to claim 4 characterized in that at least one of said support members is adjustably connected to the frame to accommodate pipes of substantially different lengths.

6. An apparatus according to claim 4 characterized in that said platform is resiliently tiltable about an upright axis so as to assure engagement regardless of variations in the angle of cut-off of the pipe.

7. In an apparatus for molding seals on the ends of a pipe having a spigot end and a bell end, a first die for the bell end and disposable within the bell and having an external peripheral molding wall spaced radially inwardly from the internal peripheral wall of the bell to provide therewith a mold cavity between said walls when the die member is so disposed, a second die member for the spigot end and having an internal peripheral molding wall, said second die member being disposable in a position in which its said peripheral wall surrounds the external peripheral wall of the spigot end to provide therewith a mold cavity between the last mentioned wall of the second die member and spigot end, respectively, when the second die member is so disposed, a support for supporting at least one of said die members for movement, relatively toward the other of said die members, into engagement with its associated end of the pipe and for tilting movement about the pipe axis into proper position relative to the pipe axis for seating on the end of the pipe, and said support including resilient means yieldably urging at least said one of said die members toward the other and into cooperation with its associated end of the pipe while yieldably resisting tilting thereof relative to the pipe axis.

8. The structure according to claim 7 wherein a pipe support is provided and is arranged to engage the under side of the bell and support the pipe in upright position with its bell at the top with the die members in molding position on the pipe, and said support is movable for transporting the pipe to different selected locations while the die members are in said molding position on the pipe.

References Cited in the file of this patent

UNITED STATES PATENTS

| Number | Name | Date |
| --- | --- | --- |
| 534,445 | Miller | Feb. 19, 1895 |
| 1,457,290 | Schroeder | May 29, 1923 |
| 1,840,447 | Holstead | Jan. 12, 1932 |
| 1,853,344 | Fobert | Apr. 12, 1932 |
| 1,984,691 | Nardiello | Dec. 18, 1934 |
| 2,091,504 | Gray | Aug. 31, 1937 |
| 2,222,615 | Hart, Jr. | Nov. 26, 1940 |
| 2,284,741 | Johnston | June 2, 1942 |
| 2,345,670 | Heath | Apr. 4, 1944 |
| 2,368,610 | Fischer | Jan. 30, 1945 |
| 2,388,042 | Daily | Oct. 30, 1945 |
| 2,458,684 | Crandell | Jan. 11, 1949 |
| 2,535,451 | Phillips | Dec. 26, 1950 |
| 2,548,251 | Beigstein | Apr. 10, 1951 |
| 2,557,439 | Kmentt | June 19, 1951 |
| 2,574,706 | Perrault | Nov. 13, 1951 |
| 2,595,502 | Aicher et al. | May 6, 1952 |
| 2,608,501 | Kimble | Aug. 26, 1952 |
| 2,608,721 | Heinzelman | Sept. 2, 1952 |
| 2,630,613 | Webb | Mar. 10, 1953 |
| 2,632,918 | Bergstein | Mar. 31, 1953 |
| 2,634,522 | Leef | Apr. 14, 1953 |
| 2,635,287 | Taber | Apr. 21, 1953 |
| 2,661,500 | Seymour et al. | Dec. 8, 1953 |
| 2,672,652 | Howe et al. | Mar. 23, 1954 |
| 2,708,055 | Alexander | May 10, 1955 |
| 2,708,306 | Lampton | May 17, 1955 |
| 2,715,484 | Alexander | Aug. 16, 1955 |
| 2,724,175 | Kjellberg | Nov. 22, 1955 |